Figure 1:
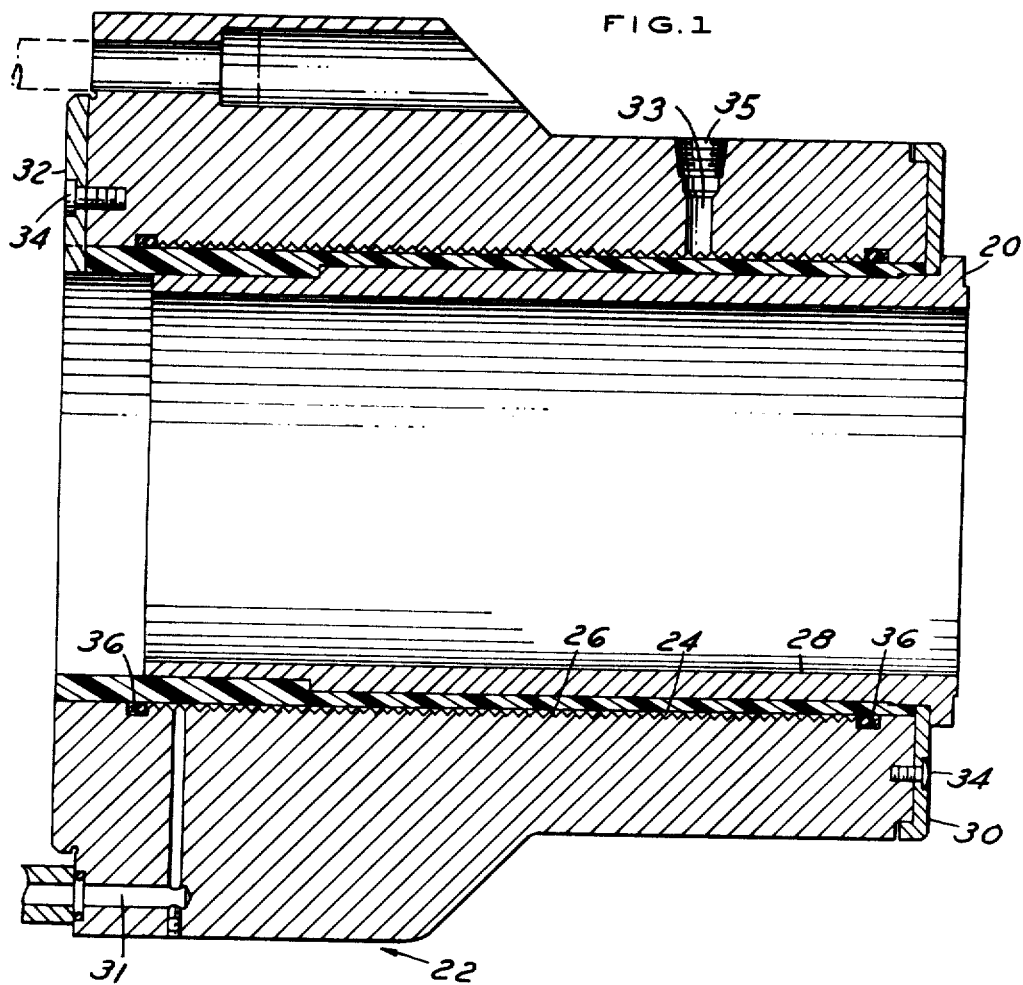

United States Patent [19] [11] 3,677,559
Andre et al. [45] July 18, 1972

[54] HYDROSTATIC HOLDING DEVICE

[72] Inventors: Eugene R. Andre; John M. Rautio, both of 12024 East Nine Mile Rd., Warren, Mich.

[22] Filed: Jan. 19, 1971

[21] Appl. No.: 107,817

Related U.S. Application Data

[63] Continuation-in-part of Ser. No. 736,840, June 13, 1968, abandoned.

[52] U.S. Cl. .................................................. 279/1 Q, 279/4
[51] Int. Cl. ........................................................... B23b 31/10
[58] Field of Search ....................... 279/3, 4, 1 Q, 1 N; 269/20, 269/30

[56] References Cited

UNITED STATES PATENTS

| | | | |
|---|---|---|---|
| 2,615,644 | 10/1952 | Enz | 279/1 Q |
| 2,720,735 | 10/1955 | Ruehl et al. | 279/1 Q |
| 3,602,521 | 8/1971 | Uhtenwoldt | 279/1 Q |
| 3,608,161 | 9/1971 | Kost et al. | 279/4 X |

Primary Examiner—Andrew R. Juhasz
Assistant Examiner—James F. Coan
Attorney—Barnes, Kisselle, Raisch & Choate

[57] ABSTRACT

A hydrostatic holding device which employs a relatively thin wall sleeve in either internal or external holding units and utilizing a sleeve of pliant material such as nylon which is relatively soft compared to metal parts which are to be clamped, the concept being a sleeve material which will conform to the surface conditions of the part being held and exert pressure thereon without changing the shape of the part. Additional features include differential pressures and differential wall thicknesses to compensate for differential thicknesses in the work part. Other features include the use of pressure and vacuum to manipulate the pliant wall to assure proper gripping particularly on parts which may have a recessed portion.

7 Claims, 7 Drawing Figures

INVENTORS
EUGENE R. ANDRE
JOHN M. RAUTIO
BY
Barnes, Kisselle, Raisch & Choate
ATTORNEY INVENTORS
EUGENE R. ANDRE
JOHN M. RAUTIO
BY
Barnes, Kisselle, Raisch & Choate
ATTORNEY Patented July 18, 1972

3,677,559

4 Sheets-Sheet 3

INVENTORS
EUGENE R. ANDRE
JOHN M. RAUTIO
BY
Barnes, Kisselle, Raisch & Choate
ATTORNEYS INVENTORS
EUGENE R. ANDRE
JOHN M. RAUTIO
BY
Barnes, Kisselle, Raisch & Choate
ATTORNEYS

HYDROSTATIC HOLDING DEVICE

This application is a continuation-in-part of our application, Serial No. 736,840, filed June 13, 1968, and now abandoned and entitled "Hydrostatic Holding Device."

BACKGROUND OF THE INVENTION

This invention relates to improvements in holding devices utilizing the displacement of a thin-wall sleeve, induced by hydrostatic pressure, to clamp a workpiece to a main body of the holding device.

U. S. Patents Nos. 2,744,756 and 2,797,604 and the references cited therein are illustrative of the prior art hydrostatic holding devices. These devices utilize a hydrostatic pressure to expand a relatively thin-wall metal sleeve which exerts a force on a workpiece, thereby clamping it to the holding device. This type of holding device operates at rather high hydrostatic pressures and can apply a high force to a workpiece. These devices have created particularly severe distortion problems when utilized to hold relatively thin-wall workpieces such as cylinder liners. If the liner is initially out-of-round, the clamping forces tend to distort it into a round configuration. This results in the machined surfaces being out-of-round, even though initially being accurately machined, when the workpiece is removed from the holding device and allowed to return to its original out-of-round free state.

DESCRIPTION OF THE INVENTION

The present invention solves this distortion problem by utilizing a sleeve formed from a pliant material such as a plastic or other materials which will be described below. It is believed that this material molds itself to the out-of-round configuration of the workpiece, thereby allowing the clamping forces developed by the hydrostatic pressure to be more uniformly distributed over the surface of the workpiece so that it is not distorted by the clamping forces. This device also operates satisfactorily at substantially lower hydrostatic pressures than similar devices having metal sleeves. In many instances this has eliminated the need for special high pressure pumps, since the device can be actuated by the hydraulic system of the machine on which it is used to hold the workpieces to be machined.

The present invention also contemplates a means for adapting the pliant material used as a holding sleeve to a part having different wall thicknesses axially spaced to insure relatively equal pressure on the part by differential pressure application or differential wall thickness.

Another feature of the invention is the adaptation of the device to a work part which may have a surface indentation wherein a pliant sleeve may move into the indentation and grip it and then be removed by a vacuum application to the actuating pressure.

The invention further contemplates a special wall weakening to accommodate to this type of part.

The main object of the invention is the provision of a hydrostatic holding device which employs a relatively thin wall of pliant material which can be used against either an external or an internal wall of a work part by reason of either an external or internal pressure holding unit, the concept being to apply a relatively light pressure which because of the large area will provide a very tight resistance to torque slippage and yet not change the original roundness or shape of the part being held.

A principal object of this invention is thus to provide an improved holding device which will hold out-of-round thin-wall workpieces against a working torque without distortion.

Another object of this invention is to provide a hydrostatic holding device that functions at a relatively low hydrostatic pressure.

Other objects and features of this invention will be apparent from the following description and claims in which there is found the manner of making and using the invention in the best mode contemplated by the inventors for carrying out the invention.

Drawings accompany this disclosure and the various views thereof may be briefly described as:

FIG. 1, a sectional view of a hydrostatic holding device clamping on the external surface of a thin-wall cylinder liner.

Figure 2:
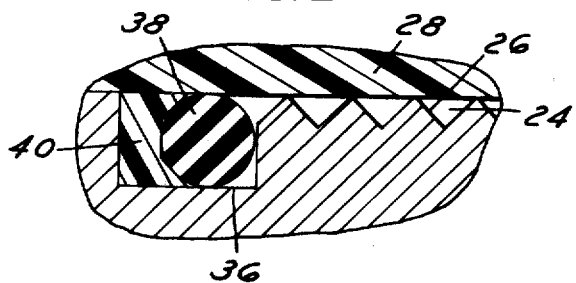

FIG. 2, an enlarged view of a portion of FIG. 1, showing the constructional details of a sealing means.

Figure 3:
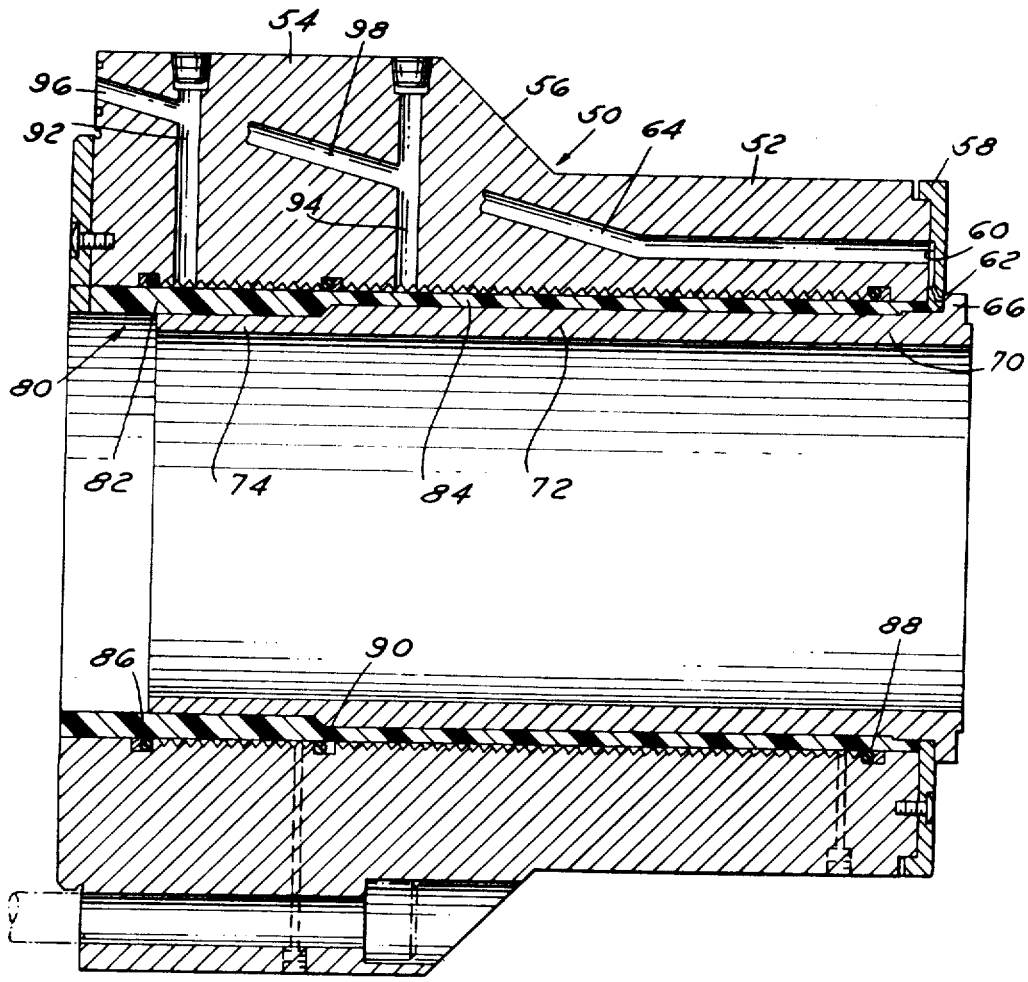

FIG. 3, a sectional view of a modified unit for use with differential pressures.

Figure 4:
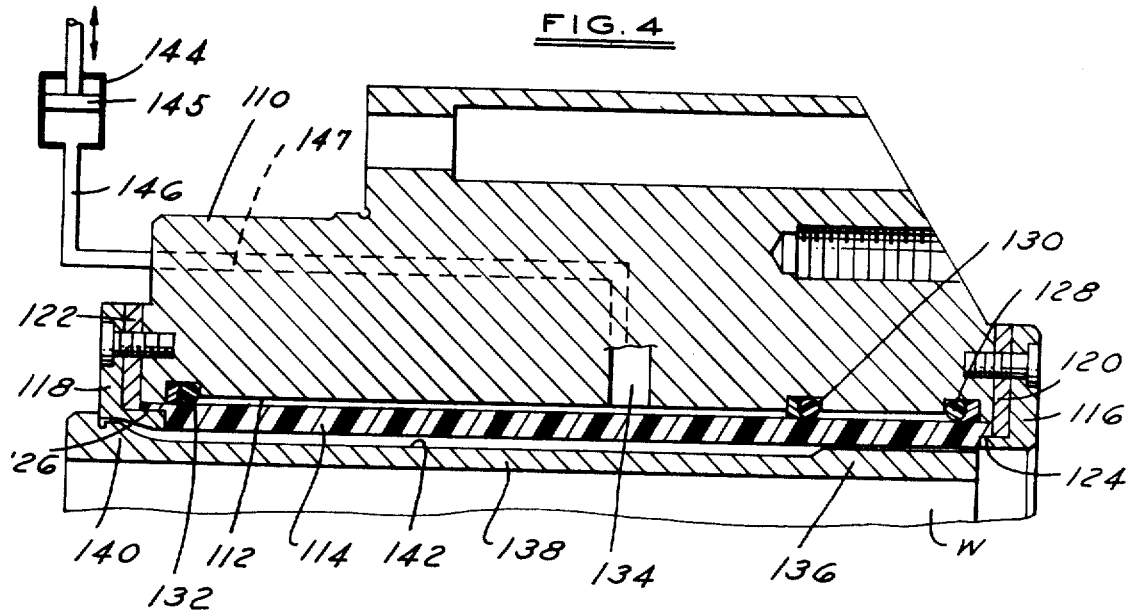
Figure 5:
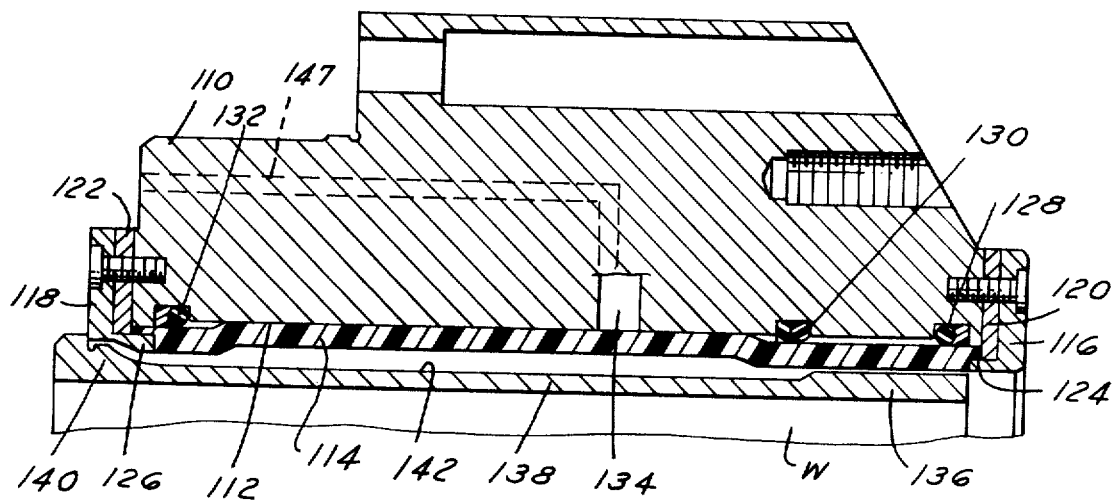
Figure 6:
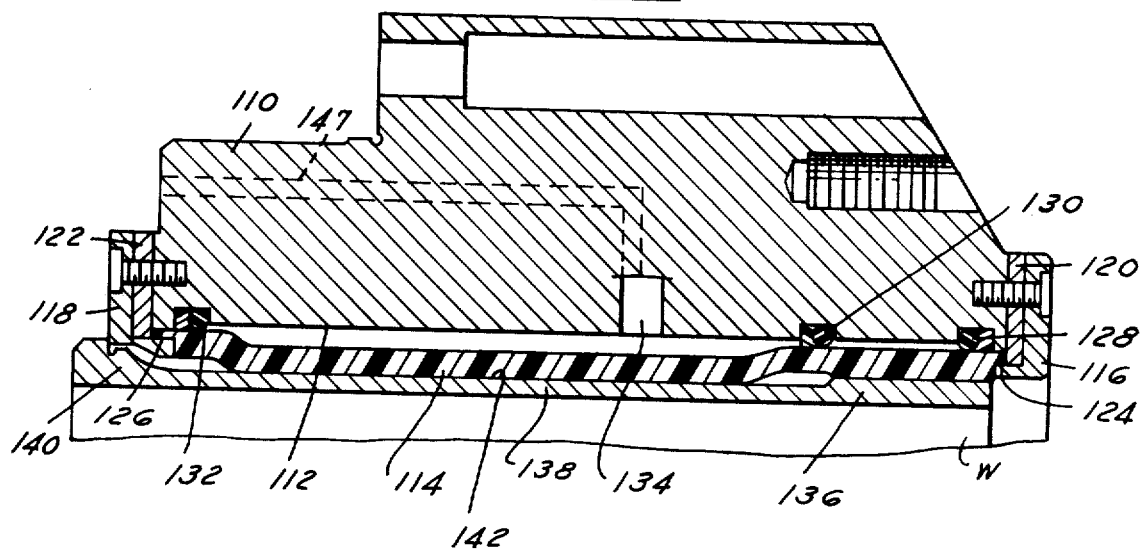

FIGS. 4, 5, and 6, views of a modified construction adapted for use with parts having surface recesses of different diameters, the construction being adapted to enter and clamp and move outwardly from the recesses for removal.

Figure 7:
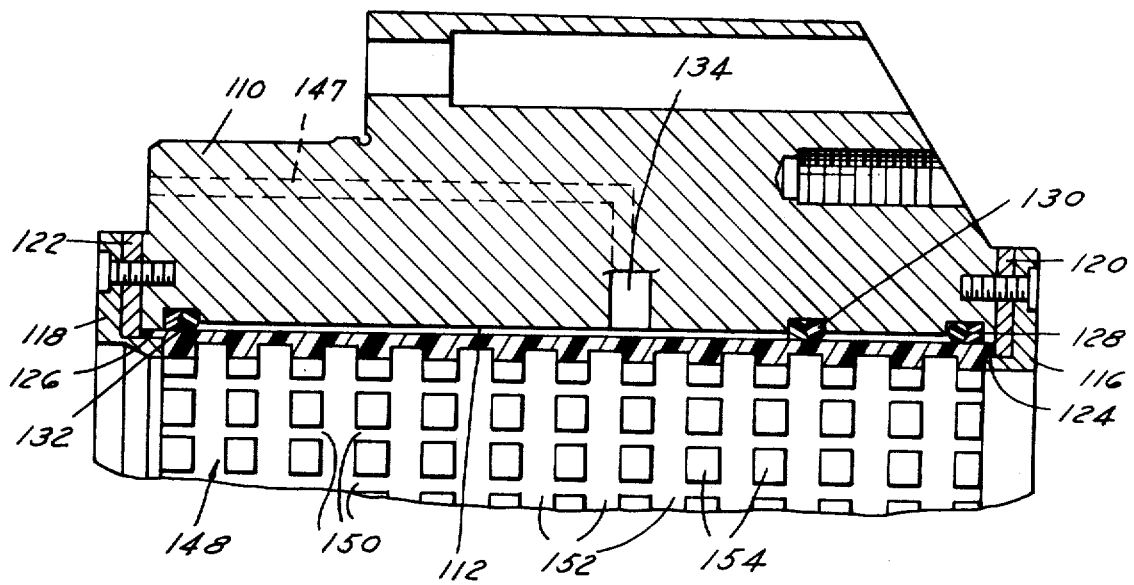

FIG. 7, a view of a modified form of pliant sleeve having a special configuration to improve flexibility.

REFERRING TO THE DRAWINGS

In FIG. 1, a cylinder liner 20 is shown clamped in a main body 22 of a holding device by hydrostatic pressure in a chamber 24. The chamber 24 is formed by a plurality of threads 26 on the inner surface of main body 22 in cooperation with a sleeve 28. The chamber could also be formed with a rectilineal recess (not shown) in the main body 22 rather than a plurality of threads 26, but the threads represent the preferred embodiment of the chamber 24 because they provide a chamber that is easier to bleed or remove the air from when filling the chamber with a fluid. This threaded chamber structure is fully disclosed in U. S. Pat. No. 2,744,756.

The sleeve 28 is captivated within the main body 22 by a retainer ring 30 and a plurality of keys 32 which are attached to the main body 22 by a plurality of screws 34 or other suitable means. The retainer ring 30 and the circumferentially spaced keys 32 prevent the sleeve 28 from being longitudinally displaced relative to the main body 22, but they allow the sleeve to be displaced or moved radially by a hydrostatic pressure in the chamber 24. A passageway 31 in the main body 22 is provided for fluid entry into the chamber 24 and a passageway 33 and a plug 35 provides a means of bleeding and also a cleanout for chamber 24.

As shown in FIG. 2, a rectilineal recess 36 at each end of the chamber 24 contains an O-ring 38 and a grooved back-up ring 40. The O-ring 38 provides a seal between the main body 22 and the sleeve 28 so that the chamber 24 does not leak when subjected to hydrostatic pressure. This sealing means is fully disclosed in U. S. Pat. No. 3,122,376.

The sleeve 28 is formed from a high density flexible plastic material such as nylon or Teflon. When a hydrostatic pressure is applied to a sleeve 28 of this high density flexible material, it is believed that the material tends to distort slightly and mold to or fill in the irregularities in the roundness or shape of the workpiece 20. This flaccid or pliable characteristic of the material distributes the forces developed by the hydrostatic pressure in chamber 24 more uniformly or evenly over the surface area of the workpiece. The flexible sleeve is believed to establish a centerline from the outside diameter of the part. This allows an out-of-round workpiece to be clamped in the main body 22 without distortion. If the workpiece is initially distorted by a clamping pressure, the surfaces of the workpiece which are machined while the workpiece is distorted will become distorted or warped when the workpiece is unclamped and returned to its free state.

The use of a plastic sleeve 28 in this device has also materially reduced or lowered the pressure to which the fluid in chamber 24 must be subjected in order to clamp the workpiece 20 in the main body 22, when compared to the pressure required to actuate a similar device utilizing a metal sleeve. In many instances this has eliminated the need for special high pressure devices which have been utilized with many of the similar devices with metal sleeves, since the hydraulic systems of many of the machines on which this device is utilized have a high enough hydraulic pressure to radially displace the high density sleeve 28. This device has operated successfully with a chamber 24 pressure in the range of 50 to 350 pounds per square inch gauge. In some machining operations a higher hydrostatic pressure is employed during "roughing" operations and then the pressure is reduced to the 150 to 22 PSIG range for the "finishing" operations.

In FIG. 3, a modification is illustrated in which a body 50 has one cylindrical section 52 and a second cylindrical section 54 connected by chamfered wall 56. At the right-hand end of the body as viewed in FIG. 3 is a small cap ring 58 having an annular recess 60 on its inner surface connected to a small aperture 62. A passage 64 contains air under pressure which is reflected in a suitable gauge (not shown) so that when the flange 66 of a work part 70 moves over the hole 62 an operator will know that the part is properly seated.

It will be seen that the work part 70 has a heavy wall 72 and a thin wall 74 and under certain circumstances it may be desirable to have different pressures applied to these walls to insure proper clamping without distortion. This is accomplished by the use of a liner 80 having a heavy wall 82 and a thin wall 84 which provides the proper contact with the work. The liner is sealed at each end by an O-ring assembly 86 and 88 respectively and intermediate the two wall thickness portions is a third O-ring 90. The means for developing pressure is well known in the art, and respective passages 92 and 94 are provided which can receive pressure either from an external source through passages 96 and 98, respectively, or from built-in piston actuators (not shown).

By the use of the separate passages differential pressures may be developed between the liner portion at 82 and the body, and between the liner portion 84 and the body to insure proper contraction.

It will be appreciated also that differential pressures might be used for different cuts. For example, a rough cut or a rough bore might be made in one direction with a reasonably high pressure to withstand the higher forces of the boring tool during the roughing cut. A finish cut could then be taken with a reduced pressure, thus insuring that the gripping pressures on an out-of-round external surface would not affect the production of a round hole in the part when it is released to a free state. It will be appreciated, of course, that the utilization of the sleeve 28 in FIG. 1 to some degree compensates for the difference in wall thickness since the greater thickness of the liner over the thin part of the work creates greater resistance to the contraction pressure while the thinner wall surface of the liner at the thick portion of the work provides less resistance to the pressure.

There is, therefore, an automatic compensation and this effect could be enhanced by the utilization of an additional nylon sleeve to increase the effect. In each case it is the resilience of the relatively thin plastic sleeve which makes it a successful holding unit for the thin-walled parts. It is believed that the plastic liner responds immediately to the pressures in the various areas thereof so that it immediately fits the out-of-round condition of the part before any undue pressure is applied to any one particular area. Thus, the pressure is even around the unit and there is a minimum of distortion which would reflect when the part was again freed of the holding pressure.

In addition to the use of nylon as a material, it is also contemplated that a saturated filament of fiberglass would in the form of a tube might also be used. This material has been found to have expansion characteristics which would be acceptable. The fiberglass filaments are generally helically wound on a mandrel and saturated with a resin matrix such as various varieties of epoxy, polyester and other resins which are suitably cured to have a high density ratio. The material is, of course, corrosion resistant, non-magnetic and has a low thermal conductivity which creates advantages in connection with work applications of the type above described. The material has a high burst strength and is generally prestressed with the filament being wound under tension. A very smooth finish can be obtained in the material and because of the inherent resistance to acids, salts and so forth, there is no need for plating or rustproofing as is the case with a metal sleeve.

Also, a pliant material such as an impregnated wound fabric material of glass fibers, for example, might be used for reinforcement. Fine steel wires, for example, wound to permit expansion and embedded in a rubber, synthetic rubber, or plastic, may be used. In general, the invention contemplates the use of a sleeve having a pliant characteristic and degree of hardness less than that of metal so that it will, under the clamping pressure, conform to an out-of-round part to create the necessary gripping pressure without distorting the part, i.e., rounding it out. Thus, after the part is machined or ground to a round condition and released, it will not spring back to an out-of-round condition.

Referring to FIGS. 4, 5 and 6, there is shown an embodiment which is particularly useful for machine parts which may have an annular recess in the wall which is to be contacted such that there may be assembly problems in connection with the holding device.

Referring to FIG. 4, the circular body, the upper portion of which is shown at 110, has an internal recess 112 which is closed by the pliant sleeve 114 which is captured at the end by two annular flanges 116 and 118 respectively overlying washers 120 and 122. The ends of the sleeve 114 are reduced in cross-section respectively at 124 and 126 to underlie an annular flange of the members 118 and 120.

Suitable seals 128, 130 and 132 are shown between the body 110 and the sleeve 114 and a pressure supply passage 134 is provided. It will be seen that the work part W has an end portion 136 which is thicker than a central portion 138 and similarly an end portion 140 which has a greater diameter than the inner portion 138 leaving a surface 142 which has a smaller diameter than the two end portions. With this system, the pliant sleeve will move down into this recess as illustrated in FIG. 6 by reason of pressure in the passage 134 and the gripping will take place throughout the entire area contacted by the sleeve member 114.

In releasing the device, it is desirable to apply vacuum to the pressure passage 134 by backing off a pressure plunger which is used to create the pressure in the first instance. This suction will draw the sleeve 114 back up against the surface of the recess 112 as shown in FIG. 5 to free the work part W so that it may be readily removed from the chuck. In FIG. 4, a diagrammatic view is shown of a pressure plunger 144 having a piston 145 which exerts pressure through a channel 146 to a passage 147 leading to the passage 134. This piston can be used to apply pressure to the fluid in these passages which is usually a grease or oil and the piston can either be external to the body 110 or built into the body in such a way that screw pressure against the piston will advance it and retract it.

As has been previously described, a relatively light pressure with the full contact of the sleeve 114 will provide a very high resistance against turning of the part in the chuck since there is full area contact.

In FIG. 7, the sleeve portion 148 of the unit is shown with a double serrated surface created by longitudinal cuts parallel to the axis forming grooves 150 and circumferential grooves 152. This configuration on the sleeve will render it more flexible throughout its circumference and its length so that the pressure will be applied equally on all parts of a workpiece regardless of its distortion from perfect roundness. Thus, each pad 154 created by the channels will have a firm contact with the metal which it overlies. This device is used on parts which must be held very gently and also on parts which may have numerous surface irregularities to which the sleeve must accommodate.

While the drawings do not show it, the recess walls of the embodiments of FIGS. 4 to 7 could also be serrated as shown in FIGS 1 and 3 to facilitate the transfer of pressure and vacuum along the chamber.

We claim:

1. In a hydrostatic chuck of the type utilizing a support body having a hydrostatic pressure chamber on one surface thereof, that improvement for holding relatively thin, easily distortable work parts which comprises a pliant sleeve of flexible plastic shaped to close said pressure chamber and to fit snugly over the walls of a work part, wherein pressure in said chamber shapes said sleeve to a work part and clamps it without distortion of said part, the pressure chamber on the support body being divided into a plurality of separate chambers, each having an axial extent substantially equal to the axial extent of a particular wall thickness of a work part, and means to facilitate the application of differential pressures to said separate chambers.

2. In a hydrostatic chuck of the type utilizing a support body having an annular hydrostatic pressure chamber on one surface thereof, that improvement for holding a relatively thin, easily distortable, work part which comprises a pliant sleeve of a high density, flexible plastic nylon shaped annularly to close said pressure chamber and to fit snugly over the walls of an annular work part, wherein pressure in said chamber will move said sleeve radially to contact the walls of said work part and clamp said part without distortion thereof.

3. In a hydrostatic chuck of the type utilizing a support body having an annular hydrostatic pressure chamber on one surface thereof, that improvement for holding a relatively thin, easily distortable, work part which comprises a pliant sleeve of a high density material formed of a wound filament saturated with a cured resin shaped annularly to close said pressure chamber and to fit snugly over the walls of an annular work part, wherein pressure in said chamber will move said sleeve radially to contact the walls of said work part and clamp said part without distortion thereof.

4. In a hydrostatic chuck of the type utilizing a support body having an annular hydrostatic pressure chamber on one surface thereof, that improvement for holding a relatively thin, easily distortable, work part which comprises a pliant sleeve of a high density, flexible plastic shaped annularly to close said pressure chamber and to fit snugly over the walls of an annular work part, wherein pressure in said chamber will move said sleeve radially to contact the walls of said work part and clamp said part without distortion thereof, the annular sleeve being variant in thickness to have constant diameter on one surface and variant diameters on the opposed surface to adapt to a hollow, thin walled work part having complemental diameters on a gripping surface wherein said sleeve provides a greater radiant resistance at the thick portions of the sleeve overlying the thin portions of the part and a lesser radiant resistance at the thin portions of the sleeve overlying the thick portions of a part.

5. A hydrostatic chuck of the type utilizing a support body having an annular hydrostatic pressure chamber on one surface thereof, that improvement for holding a relatively thin, easily distortable, work part which comprises a pliant sleeve of high density, flexible plastic shaped annularly to close said pressure chamber and to fit snugly over the walls of an annular work part, the surface of the walls of said sleeve to be in contact with said work part having crossed serrations to increase the flexibility of said part and the adaptability to the surface of a work part.

6. A hydrostatic chuck as defined in claim 5 in which means is provided to apply pressure above atmospheric to said pressure chamber to move said sleeve against a workpiece and to create below atmospheric pressure in said chamber to move said sleeve away from a workpiece into said pressure chamber wherein a workpiece having a gripping surface of varying diameters may be gripped by said sleeve.

7. A hydrostatic chuck of the type utilizing a support body having an annular hydrostatic pressure chamber on one surface thereof, that improvement for holding a relatively thin, easily distortable, work part which comprises a pliant sleeve of high density, flexible plastic shaped annularly to close said pressure chamber and to fit snugly over the walls of an annular work part, and means to apply pressure above atmospheric to said pressure chamber to move said sleeve against a workpiece and to create below atmospheric pressure in said chamber to move said sleeve away from a workpiece into said pressure chamber wherein a workpiece having a gripping surface of varying diameters may be gripped by said sleeve.

* * * * *